June 15, 1948. F. T. COURT 2,443,302
FURROW GUIDED AUTOMATIC STEERING ATTACHMENT FOR TRACTORS
Filed Feb. 5, 1945
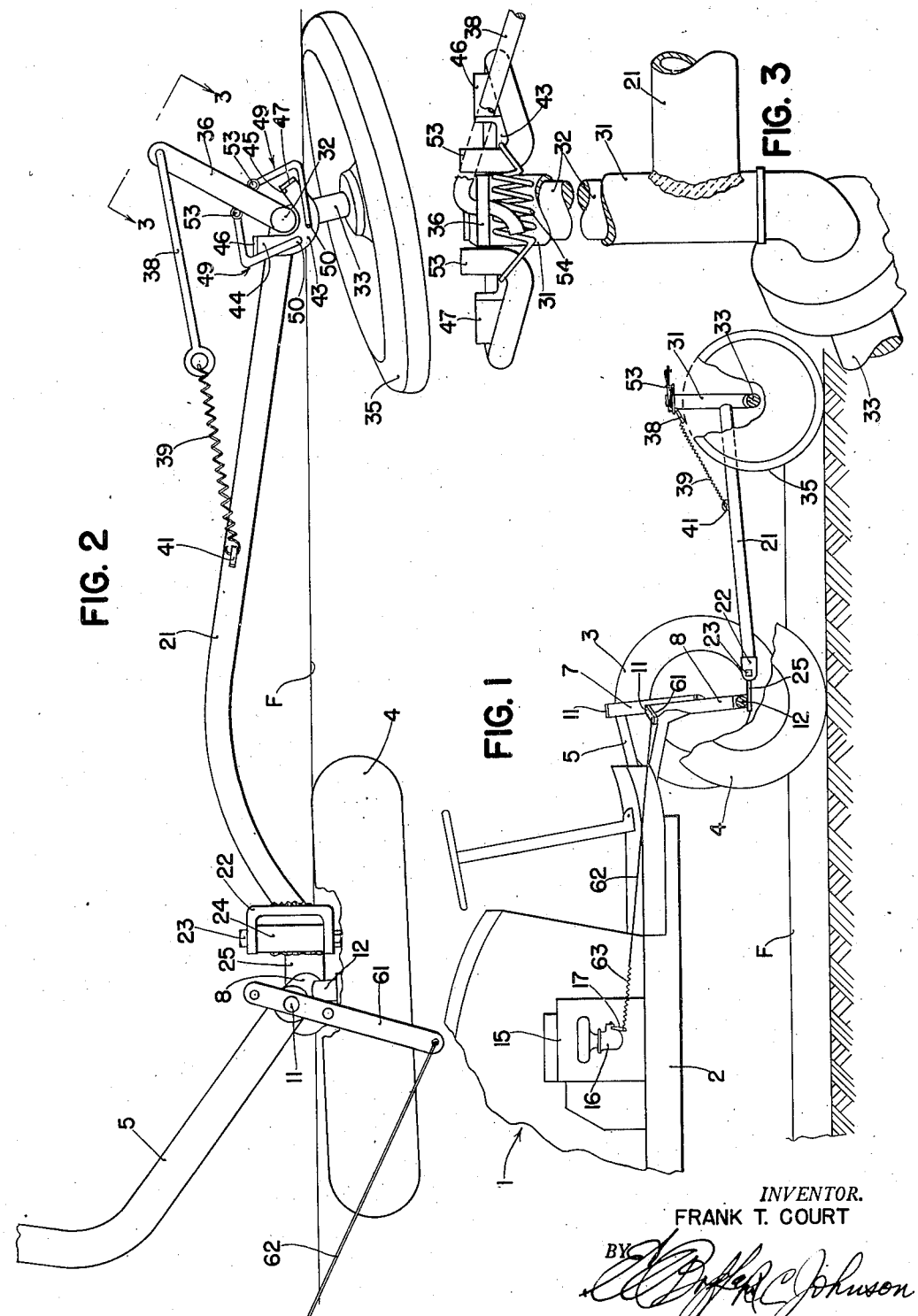
INVENTOR.
FRANK T. COURT
BY
ATTORNEYS Patented June 15, 1948

2,443,302

UNITED STATES PATENT OFFICE 2,443,302

FURROW GUIDED AUTOMATIC STEERING ATTACHMENT FOR TRACTORS

Frank T. Court, Moline, Ill., assignor to Deere & Company, Moline, Ill., a corporation of Illinois Application February 5, 1945, Serial No. 576,282

3 Claims. (Cl. 97—49)

The present invention relates generally to agricultural machines and more particularly to automatic steering devices for steering a tractor along a furrow without any attention on the part of the operator.

The object and general nature of the present invention is the provision of a tractor steering device which effectively holds the tractor wheel as well as the guide wheel of the steering device up against a furrow wall so as to accurately guide the outfit from the furrow wall irrespective of irregularities. A further feature of this invention is the provision of snubbing means effective to prevent unnecessary oscillations or vibrations so as to provide a steady running outfit more or less independent of irregularities in the ground surface or the furrow wall, yet one in which effective and accurate guiding from the furrow wall is provided. Another feature of the present invention is the provision of a tractor guiding outfit in which means is incorporated for automatically shutting down the tractor motor in the event the outfit, for any reason, gets out of the furrow. More specifically, it is a feature of this invention to provide means biasing the steering apparatus for movement over towards the furrow wall and means associated therewith and operative by the further movement of the steering apparatus in that direction, which occurs in the event the guide wheel gets out of the furrow, for stopping the tractor motor.

These and other objects and advantages of the present invention will be apparent to those skilled in the art after a consideration of the following detailed description of a preferred construction, illustrated in the accompanying drawings in which:

Figure 1 is a side view of a tractor equipped with my tractor guide.

Figure 2 is an enlarged fragmentary top view.

Figure 3 is an enlarged view taken generally along the line 3—3 of Figure 2.

Referring now to the drawings, a tractor guide constructed according to the principles of the present invention has been shown as mounted on a tractor 1 which comprises suitable frame means 2 supported on a pair of rear traction wheels (not shown) and a pair of front wheels 3 and 4. The front wheels are mounted on a front axle yoke 5, which is generally of U- or V-shaped configuration having a pair of front spindle bearing members 7 and 8 fixed thereto in generally downwardly extending relation. Each front wheel 4 is mounted on a spindle 11 having a downwardly and outwardly extending wheel-receiving section 12 of more or less conventional construction. The tractor 1 includes a motor 15 having a carburetor 16 which is provided with a choke valve 17.

The tractor guide in which the principles of the present invention have been incorporated comprises a generally longitudinally extending bar 21 having a U-shaped yoke 22 fixed as by welding to the rear end of the bar 21 and apertured to receive a hinge pin or bolt 23. The latter is carried in a bearing sleeve member 24 welded or otherwise secured to an attaching bracket 25 that is fixed in any suitable manner to the lower end of the right hand spindle 11. By this means the bar 21 is hingedly connected with the front wheel spindle 11 but is restrained by the hinge connection just described against lateral movement relative to the spindle. The front end of the bar 21, which preferably is in the form of a tubular part as best shown in Figure 3, is welded to a bearing sleeve member 31 in which a vertically extending guide wheel spindle 32 is disposed. The lower end 33 of the guide wheel spindle 32 extends downwardly and generally laterally outwardly, as best shown in Figure 2, and receives a guide wheel 35. An arm 36 is fixed to the upper end of the spindle 32 and extends laterally and also forwardly, as best shown in Figure 2, and is apertured to receive the front end of a link 38, the rear end of which receives a tension spring 39. The rear end of the spring 39 is connected to a clip 41 fixed as by welding to the bar 21. A plate 43 is fixed to the upper end of the sleeve member 31 and is bifurcated so as to present two side sections 44 and 45 (Figure 2) on opposite sides of the guide wheel spindle. The sides 44 and 45 have upturned ends 46 and 47 to form stops against which a pair of generally V-shaped snubbing arms 48 and 49 are adapted to bear. Each of these arms includes an end 50 that extends downwardly into or through an opening formed in the plate 43 and the other end, as indicated at 53, of each snubbing arm is turned upwardly and disposed normally against opposite edges of the arm 36. A spring 54 is disposed between the two snubbing arms 49 and is connected at its ends to the upturned portions 53, as best shown in Figure 3. When the parts are in their normal position (Figure 2) and both snubbing arms are against the associated stops 46 and 47, the arm-engaging ends 53 are disposed against opposite edges of the arm 36. Rocking movement in either direction from the position shown in Figure 2 results in lengthening the spring 54 and is therefore restrained or resisted by the latter.

An arm 61 is fixed to the upper end of the right hand spindle 11 and extends generally laterally and outwardly therefrom. A link 62 is connected at its forward end to the outer end of the arm 61, and at its rear end the link 62 is connected through a tension spring 63 with the carbureter choke thereof 17.

The operation of my tractor guide is substantially as follows:

The tension in the spring 39 acts to hold the guide wheel 35 in about the position shown in Figure 2, in which the two snubber arms 49, connected by the spring 54, bear against the arm 36. The spring 39 acts with sufficient force to hold the guide wheel 35 up against the furrow wall F, but irregularities in the furrow bottom do not cause excessive oscillation of the wheel 35 due to the snubbing action of the spring biased arms 49. In the event that the wheel 35 runs entirely out of the furrow, the spring 39 exerts a sufficient force to swing the wheel 35 sharply around in a landward direction, which, in turn, causes the arm 21 to be swung in the same direction. This turns the wheel 4 in that direction and exerts a forward pull through the link 62 and spring 63. This closes the choke valve and chokes the motor so that it stops. When traversing short broken spaces in the furrow wall F, the wheel 35 is caused to pass over these spaces due to the snubbing action of the arms 49 which prevents the stronger spring 39 from immediately swinging the wheel 35 around landwardly, yet if the wheel 35 runs entirely out of the furrow the steering arm 21 is eventually swung around landwardly so as to stop the motor. The relatively small amount of oscillation which an irregular ground surface might impart to the wheel 35 does not cause any appreciable oscillation or vibration of the associated tractor wheels 4.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A steering device for tractors having dirigible wheel means, comprising a forwardly extending bar, means connecting the rear end of said bar with said dirigible wheel means to steer said dirigible wheel means, a guide wheel including an arm, said wheel being swingably connected with the forward end of said bar and movable relative to the latter about a generally vertical axis, spring means acting between the front end of said bar and said wheel means for yielding opposing movement of the latter in either direction from a given position so as to dampen oscillation of the wheel means as when passing over uneven ground and the like, biasing means separate from said spring means, and means connecting said separate biasing means to said bar and to said guide wheel arm so as to swing said guide wheel relative to said bar in one direction, as up against a furrow wall, whereby swinging the guide wheel at the forward end of said bar serves to cause the forward movement of the tractor to cause said bar to swing in the direction the guide wheel is swung relative to said bar.

2. A steering mechanism for a tractor having a front wheel spindle, comprising a forwardly extending bar hinged at its rear end to said spindle for vertical swinging movement, a guide wheel having a generally vertical spindle, generally vertical bearing means, means connecting the latter to the front end of said steering bar for receiving the guide wheel spindle, and biasing means connected to said bar and said guide wheel spindle tending to turn said guide wheel in one direction, said biasing means including a part fixed to said wheel spindle and extending outwardly therefrom, a pair of arms bearing at their outer ends against said part, means pivoting the inner ends of said arms to said bar adjacent said vertical bearing means, and a spring connecting the ends of said arms.

3. A steering device for a tractor plow combination, in which the tractor is of the four wheel type and is normally operated with one front wheel in a previously formed furrow, said steering device comprising a forwardly extending arm, means connecting the rear end of said bar with said front wheel of the tractor so as to steer the same, a guide wheel at the front end of said forwardly extending arm, a spindle sleeve carried by the front end of the latter, a steering spindle for said guide wheel mounted for rocking movement in said spindle sleeve, an arm fixed to the upper end of said guide wheel spindle, a pair of pivoted snubber arms pivoted to the upper end of said sleeve and acting at their outer ends against opposite sides of said guide wheel spindle arms for restraining the latter and said guide wheel against oscillation, said guide wheel spindle arm being normally disposed so as to hold said guide wheel in a position leading toward the furrow wall and said forwardly extending arm being connected with said tractor wheel so as to lead the tractor wheel toward the furrow wall, and a spring connecting said forwardly extending arm and said guide wheel spindle arm, said spring being adapted to overcome said snubbing arms in the event the guide wheel runs out of the furrow, whereby said spring serves to swing said guide wheel over into a position to cause the tractor to steer relatively sharply in a landward direction, a member movable with said guide wheel when the latter is swung into said position, and means operative by movement of said member for stopping the tractor motor.

FRANK T. COURT.

REFERENCES CITED

The following references are of record in the file of this patent:

UNITED STATES PATENTS

| Number | Name | Date |
|---|---|---|
| 1,117,263 | Shute | Nov. 22, 1914 |
| 1,200,106 | Heylman | Oct. 3, 1916 |
| 1,310,664 | Klassen | July 22, 1919 |
| 1,540,634 | Kirchhoff | June 2, 1925 |
| 1,588,497 | Rietzke | June 15, 1926 |
| 1,659,234 | Boda | Feb. 14, 1928 |
| 2,113,889 | Kunkel | Apr. 12, 1938 |